United States Patent
Takahashi et al.

Patent Number: 5,469,091
Date of Patent: Nov. 21, 1995

[54] DATA SLICE CIRCUIT

[75] Inventors: Shinichi Takahashi, Milton, Wash.; Masayuki Nakaimuki, Takatsuki; Yukihiro Yagi, Kyoto, both of Japan

[73] Assignee: Matsushita Electric Industrial Co., Ltd.k, Kadoma, Japan

[21] Appl. No.: 952,724
[22] PCT Filed: Mar. 25, 1992
[86] PCT No.: PCT/JP92/00360
§ 371 Date: Nov. 20, 1992
§ 102(e) Date: Nov. 20, 1992
[87] PCT Pub. No.: WO92/17029
PCT Pub. Date: Oct. 1, 1992

[30] Foreign Application Priority Data
Mar. 25, 1991 [JP] Japan ................. 3-060051

[51] Int. Cl.[6] ............. H03K 5/153; H03K 12/00
[52] U.S. Cl. ................. 327/73; 327/78; 327/87; 327/184
[58] Field of Search ............ 307/354, 350, 307/359, 261; 328/28, 31, 32; 327/72, 73, 63, 77, 78, 79, 87, 89, 100, 113, 114, 172, 173, 174, 175, 184

[56] References Cited
U.S. PATENT DOCUMENTS
4,852,126  7/1989  Tanaka et al. ............. 307/359
4,873,702  10/1989  Chiu ............. 307/359

FOREIGN PATENT DOCUMENTS
8913171   4/1991   France .
59-64988  4/1984   Japan .
60-206286 10/1985  Japan .
61-43886  3/1986   Japan .
62-58982  4/1987   Japan .
62-231575 10/1987  Japan .
3127576   5/1991   Japan .

OTHER PUBLICATIONS
Jacques Meyer, "Teletext: A True Monochip Solution", IEEE Transactions on Consumer Elec., Aug. 1990, 693–698.

*Primary Examiner*—Timothy P. Callahan
*Assistant Examiner*—Toan Tran
*Attorney, Agent, or Firm*—Cushman, Darby & Cushman

[57] ABSTRACT

A data slice circuit is provided for slicing the caption data or the likes included in a television signal at an optimum voltage. A product between a clock-run signal sliced by a comparator at a tentative reference voltage and a clock signal which is 16 times the clock-run signal is stored in a shift register as 16 bit information, and out of them, only the 8 bits around its center are taken in a duty-factor check block, thereby judging the suitability of the slice level. Based on the result obtained, the value of the counter is increased or decreased, and it is taken as a renewed reference voltage through a pulse width conversion circuit and an integration circuit. Also with data sliced by a renewed reference voltage, the check is executed similarly, and a slicing action at an optimum level is achieved.

5 Claims, 4 Drawing Sheets

| VALUE OF SHIFT REGISTER | OUTPUT OF DUTY-FACTOR CHECK | ACTIONS OF COUNTER |
|---|---|---|
| 1 1 1 1 1 1 1 1<br>1 1 1 1 1 1 1 0<br>1 1 1 1 1 1 0 0 | 1 0 | UP COUNT |
| 1 1 1 1 1 0 0 0<br>1 1 1 1 0 0 0 0<br>1 1 1 0 0 0 0 0 | 1 1 | NO-ACTION |
| 1 1 0 0 0 0 0 0<br>1 0 0 0 0 0 0 0 | 0 1 | DOWN COUNT |
| 0 0 0 0 0 0 0 0 | 0 0 | NO-ACTION |

DATA SLICE CIRCUIT

FIELD OF THE INVENTION

The present invention relates to a data slice circuit having a function for slicing data signals such as caption data at an optimum voltage.

BACKGROUND OF THE RELATED ART

In recent years, the necessity of adding a tele-caption function to a television set has arisen from the consideration of an auditory handicapped person. Accordingly, the necessity of installing a one-chip microcomputer containing a caption decoder has been increasing.

FIG. 5 shows a data slice circuit of prior art, wherein numeral 1 is a comparator having a caption data input and a reference voltage input, and numeral 2 is a block representing the caption decoder accepting the output of the comparator 1 as its input.

The operation of a slice level correction circuit constituted as described above, is explained below.

First, the reference voltage of the comparator 1 is set to a constant value. The caption data input into the comparator 1 are sliced taking the reference voltage as its reference and then input into the caption decoder 2. By looking up the result of the caption decoder, when the slice level is anomalous and hence the caption data cannot be taken in correctly, once again the caption data are taken in with changing the reference voltage of the comparator 1.

In the above constitution, however, whether the caption data are correctly sliced and input into the caption decoder or not must be judged by the result obtained through the caption decoder by seeing the character data appearing on, e.g., a television screen. The slice level must be corrected in accordance with this result. In order to achieve this, due to the diversity of various tele-caption systems, there has been a problem in that the check and correction of slice levels were required.

A data slice circuit having a function by which the slice level of caption data is corrected was disclosed in the Gazette of Japanese Unexamined Patent publication Sho 61-43886 (Inventor: Teiji OKAMOTO). This circuit is a circuit wherein a signal including predetermined n-pulse trains (clock-run signal) is converted into digital data by a comparator which compares them with a reference voltage. It comprises a pulse width detection means for detecting the pulse width of the above-mentioned n-pulse train, an averaging means for averaging the output of the above-mentioned pulse width detection means and a digital-to-analog conversion means for converting the output of the above-mentioned averaging means into analog voltage, and thereby the output voltage of the above-mentioned digital-to-analog conversion means is taken as the reference voltage of the above-mentioned comparator.

There has been a problem in that the above-mentioned circuit was not suited for circuit integration because the circuit became large since it necessitated an averaging means, a memory means, and a digital-to-analog conversion means.

The present invention solves the above-mentioned existing problems and provides a data slice circuit that is suitable for circuit integration, which has functions for checking the slice level of the data signal and issues the signal for correcting the level thereof.

SUMMARY OF THE INVENTION

A data slice circuit of the present invention comprises:

comparison means for issuing the result of a comparison of at least an arbitrary one period of data signal with a first reference voltage, means for producing a product of the above-mentioned output and signal of a frequency of two or more times of the above-mentioned data signal, means for storing the above-mentioned product output as a bit train and, means which varies the above-mentioned first reference voltage and gives it to the above-mentioned comparison means responding to the value of the above-mentioned bit train based on a predetermined rule.

In addition a data slice circuit of the present invention comprises:

comparison means for issuing the result of comparison of at least an arbitrary one period of data signal with a first reference voltage, means for producing a product of the above-mentioned output and signal of a frequency of two or more times of the above-mentioned data signal, means for storing the above-mentioned product output as a bit train and, means which varies the above-mentioned first reference voltage and gives it to the above-mentioned comparison means based on a predetermined rule and referring only to bits extracted from such parts that are included in effectively the same time period before and after the center of the above-mentioned one period out of the above-mentioned stored bit train.

BRIEF DESCRIPTION THE DRAWINGS

FIG. 1 and FIG. 2 are block diagrams of data slice circuits of the present invention. FIG. 3 is a chart showing signal waveforms of different parts of the data slice circuits shown in FIG. 1 and FIG. 2. FIG. 4 is a table showing mutual correlation between various values of a clock-run signal taken into the shift registers responding to the slice levels and the counter action activated by the result of a duty-factor check. FIG. 5 is a block diagram showing a data slice circuit of prior art.

DESCRIPTION OF THE PREFERRED EMBODIMENTS

In the following, explanation is given of the preferred embodiments of the present invention, with reference to the drawings.

Figure 1:
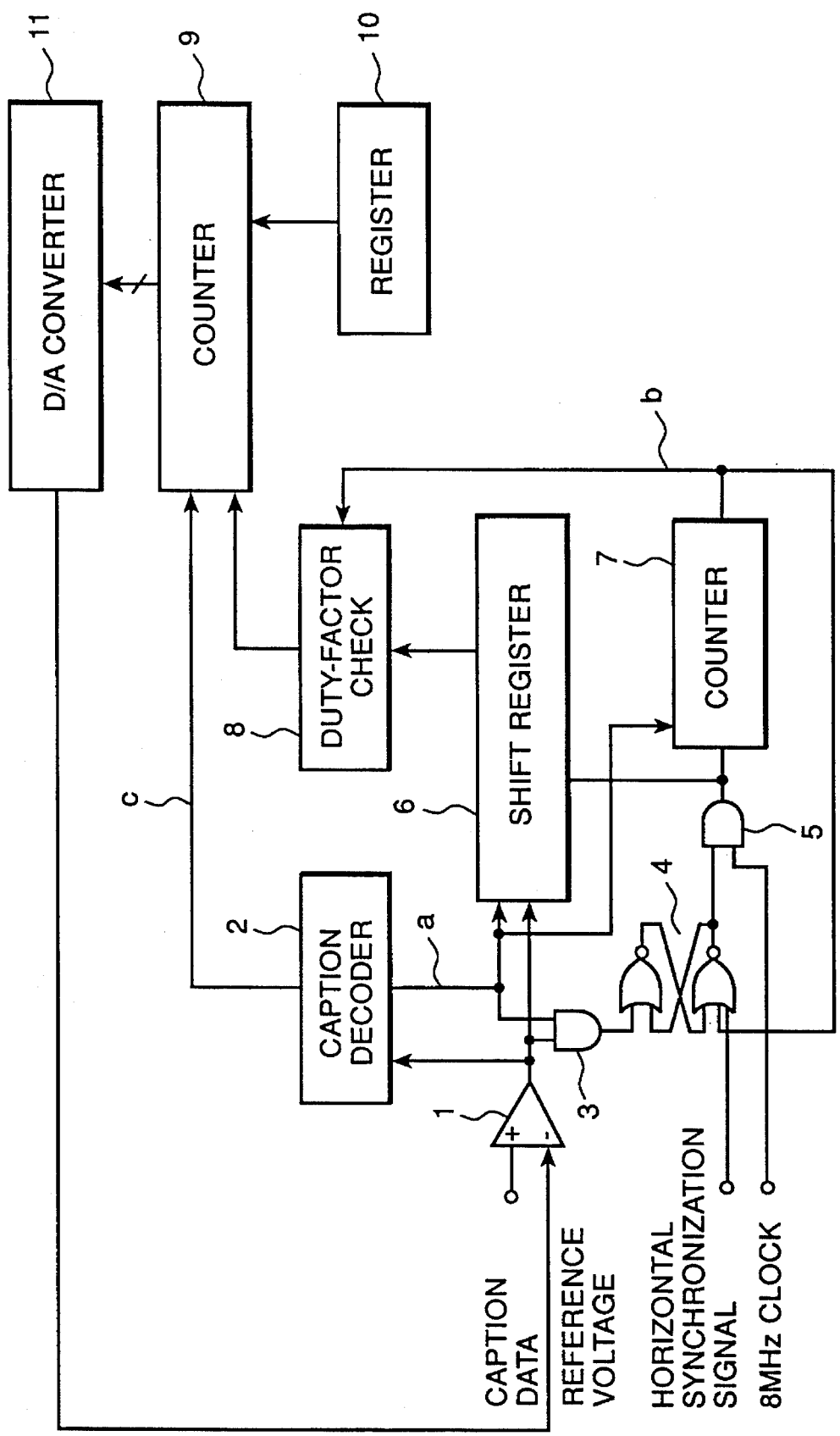

In FIG. 1: numeral 1 is a comparator into which a reference voltage and caption data are inputted; numeral 2 is a caption decoder having the sliced data of the comparator 1 as its input, "a" is a line-enable signal which allows the arbitrary horizontal synchronous signal period (hereinafter, called as "line") including caption data issued from the caption decoder 2; numeral 3 is an AND circuit having the output of the comparator 1 and the line enable signal "a" as its input; numeral 4 is an RS flip-flop circuit which is set by the output of the AND circuit 3 and is initially-reset by the horizontal synchronous signal; numeral 5 is an AND circuit having the output of the RS flip-flop circuit 4 and a signal of 8 MHz which becomes a fundamental clock of an on-screen display as it input; numeral 6 is a shift register which is shifted by the output of the AND circuit 5 and takes in the output of the comparator 1 during the period of the line enable signal "a"; numeral 7 is a counter which counts the output of the AND circuit 5 during the period of the line enable signal "a", "b" is an overflow signal of the counter 7; and numeral 8 is a block which checks the duty-factor of the clock-run signal taken in the shift register 6 at the timing of the overflow signal "b".

Reference "c" is a signal which is synchronized to a vertical synchronization signal issued from the caption decoder 2; numeral 9 is a counter which determines one action from up, down, or no-action in accordance with the result from the block 8 that is for checking the duty-factor of the clock-run signal and works and acts taking the signal "c" that is synchronized to the vertical synchronization signal as its clock; numeral 10 is a register for setting the initial data of the counter 9, and numeral 11 is a digital-to-analog (D/A) converter which inputs the result of the counter 9 as its data and outputs the result as a reference voltage of the comparator 1.

Figure 3:
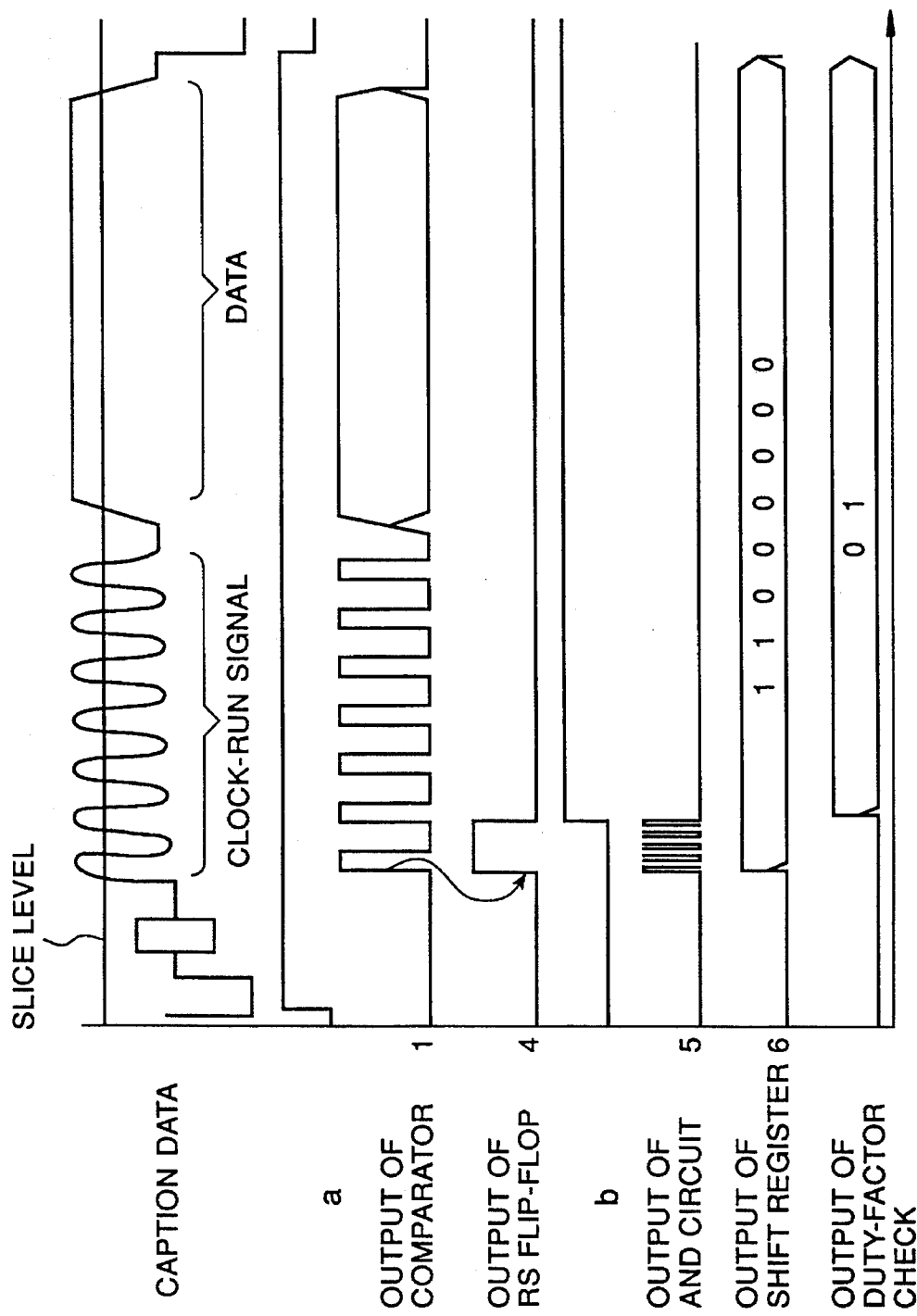

In FIG. 3, principal signals and output waveforms of the constitutional elements are shown.

On the check function and the correction function of the slice level in the data slice circuit which was constructed as has been described above, its action is explained below.

First, explanation is given on the check function of the slice level. A signal including the clock-run signal and caption data is sliced at a certain reference voltage in the comparator 1 and input into the caption decoder 2. This initial reference voltage is the one that was D/A-converted from the initial data of the counter 9 determined by the value of the register 10. As the initial value of the register 10, a value corresponding to an expected optimum reference voltage has been stored.

Hereupon, as one determination method for the initial value of the counter 9, first the value of the counter 9 is set to be a sufficiently large value, and then the slicing action is tried with the value determined above. The result should become that, because of an excessive value of the reference voltage, bit information entering into the counter 9 is all "0". Next, after decreasing the value of the counter 9, the same action is tried. This process is repeated until "1" appears on the bit information of the shift register 6. The process can proceed to the checking by the duty-factor check block 8, taking as its initial value the value of the counter 9 at the time when "1" first appears. This action may be performed by a microcomputer program or it may be done by hardware.

In the caption decoder 2, upon finding the arbitrary lines which include caption data, the line enable signal "a" is issued. The enable signal "a" and the output of the comparator 1 are input into the set terminal of the RS flip-flop circuit through the AND circuit 3. Accordingly, after inputting the horizontal synchronization signal, when the clock-run signal enters as the output of the comparator 1, the RS flip-flop circuit is set; and the AND circuit 5 starts supplying the 8-MHz clock to the shift register 6 and the counter 7. At this time, since the shift register 6 is also enabled by the line enable signal "a" of the caption decoder 2, it becomes possible to take the sliced clock-run signal that is the output of the comparator 1 into the shift register 6 taking the output of the AND circuit 5 as its clock. The counter 7 which works with the output of the AND circuit 5 as its clock generates the overflow signal "b" after a definite time has elapsed, thereby resetting the RS flip-flop circuit 4. Consequently, at the time of generation of the overflow signal "b", the counter 7 and the shift register 6 stop their action. At the same time, data in the shift register 6 under this situation are taken into the duty-factor check block 8 by the overflow signal "b".

In the present working example, sampling is executed on the initial one period of the clock-run signal. The frequency of the clock-run signal is approximately 500 kHz; and in the case that this is sampled at a clock of 8 MHz, the counter 7 issues the overflow signal at the time when the counted number becomes 16. And, during a period of one period length of the clock-run signal, information of 16 bits is obtained and stored in the shift register 6.

For the sampling clock given to the AND circuit 5, a frequency of at least two times as high as the frequency of the signal which is the object of slicing action is required, and favorably, it should be eight times or more.

This duty-factor check block 8 has a function of converting the bit information stored in the shift register 6 into 2-bit information in accordance with a predetermined rule.

In this case, it is also possible to check the duty-factor using all the bits (in the above example, 16 bits) which were sampled during one period of the clock-run signal. In actual cases, however, in one period of the clock-run signal, in such time-intervals near its both ends, even the duty-factor deviates considerably from 50%, it is fixed actually to "1" or "0"; and hence its importance as the sampling action is low. Then it is more favorable to execute the sampling only for those time intervals that are limited to regions which are equidistance before and after the center of one period.

For example, a favorable mode of embodiment employs a clock of 8 MHz, sampling for only 8 pulses in total, that is, only for as many as respectively 4 pulses which are before and after the center of one period time interval of the clock-run signal.

In such embodiment, the data slice circuit has the features as is described below. That is, among the 16 bits of information stored in the shift register 6, only the 8 bits of information excluding the 4 bits at both ends (8 bits in total) are sent to the duty-factor check block. This means that, among the series connected shift registers, only the output of the 8 bits around the center are connected to the duty-factor check block 8.

Figures 4, 5:
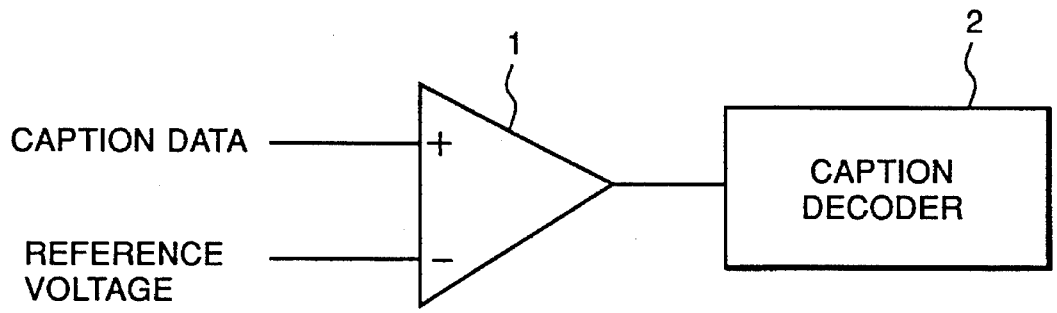

FIG. 4 is a table showing how the sampled information collected in the above-mentioned favorable embodiment and the values of the up-down counter 9 are controlled responding to the above-mentioned extracted information. In the case of no less than six bits of sampled bit train of 8 bit configuration are "1", a signal "10" by which the value of the up-down counter is up-counted is issued. Conversely, in case that "1" of the sampled bit train is no more than two bits, a signal "01" by which the value of the up-down counter is down-counted is issued. In case that "1" of the sampled bit train is no less than 3 bits and no more than 5 bits, the duty-factor is considered to be approximately 50%, then an output signal "11" is issued, and the value of the up-down counter is kept as it was. In the case that the sampled bit train is all "0", the output signal "00" is issued since there is a fear that any anomaly arises in the sampling; and in this case also, the value of the up-down counter is kept as it was.

Namely, in the case that the duty-factor of the result of the slice of the clock-run signal is not 50%, but it is less than a predetermined lower limit value, the duty-factor check block 8 issues a signal for executing the down count to the counter 9. Then, the counter 9 receives the signal "c" that is synchronized to the horizontal synchronization signal during a time interval before the next caption data enter thereinto, the down count action is executed only one time, and thereby the value is decreased. As a result, a renewed reference voltage, which is outputted through the D/A converter 11 and is corrected slightly downward in comparison with the initial tentative reference voltage, is given to the comparator 1.

Conversely, in the case that the duty-factor of the result of the slicing action of the clock-run signal exceeds a predetermined upper limit value, a signal for executing the up-count is issued to the counter 9. Thereby the value of the counter 9 increases. The result thereof is issued through the D/A converter 11, and then a renewed reference voltage, which is corrected slightly upward in comparison with the initial tentative reference voltage, is given to the comparator 1. In the case that the duty-factor is between the above-mentioned lower limit value and upper limit value, or when there no duty-factor is present, that is, when the clock-run signal could not be taken in, the counter 9 does not act (value does not change).

Figure 2:
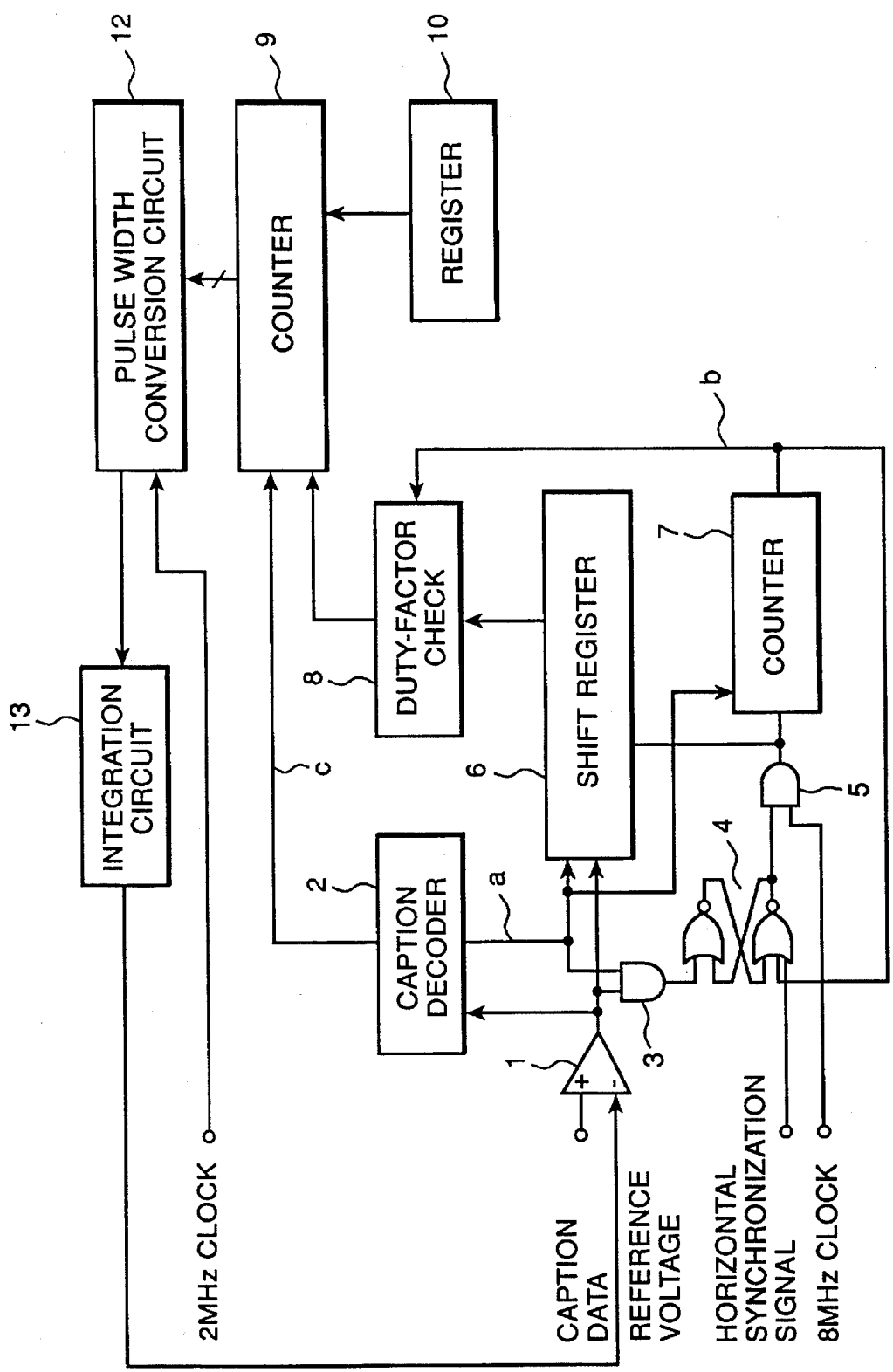

FIG. 2 is a block diagram showing the constitution of a data slice circuit in accordance with another preferred embodiment of the present invention. In comparison with the embodiment shown in FIG. 1, the means through which the digital signal is converted into an analog signal is different. In the embodiment in FIG. 1, although the digital signal was converted into an analog signal by a D/A converter, in the embodiment of FIG. 2, the digital signal is converted into an analog signal by a pulse width conversion circuit 12 and an integration circuit 13. The pulse width conversion circuit 12 receives the value of the counter 9, then converts it into a pulse width with a clock of, for example, 2 MHz. If the clock of 2 MHz is used as in common with the system clock of the microcomputer, it becomes a constitution suitable for realization into a microcomputer including a data slice circuit and a data decoder. The integration circuit 13 receives the output of the pulse width conversion circuit 12 and converts it into an analog value, and can be realized with the use of a low-pass filter (LPF).

By use of such constitution described above for the conversion means, any D/A converter, whose circuit size normally is large, is not required, hence it is suited to bring the circuit into an integrated circuit, and hence it becomes possible to realize a microcomputer including a data slice circuit provided with functions of check and correction of the slice level in a single chip.

The operation of the embodiment shown in FIG. 2 otherwise is the same as with the one explained with reference to FIG. 1.

It is not necessarily required to execute the sampling of the slice data in the first one period, it is possible to do it in any one period after the first period. It would be also possible to execute the sampling over a plural number of periods; but in such case, it would introduce inconvenience such that the size of the register for storing the bit information becomes large, or circuits such as an averaging circuit become necessary.

As has been described above, according to the present invention, it becomes possible to realize a data slice circuit, by which the duty-factor of the clock-run signal is checked and as a result the slice level can be corrected automatically.

As has been described, the data slice circuit in accordance with the present invention provides an optimum slice level in the slice operation of the data signal data caption information included in the television signal can be obtained. In addition to the above, since it can be constituted with a compact circuit, circuit the integration of the circuit including the data decoder becomes easy.

We claim:

1. A data slice circuit comprising:

comparison means for issuing a result of comparison of an arbitrary one period of a data signal with a first reference voltage;

product means for producing a product of an output of said comparison means and a signal having a frequency of at least two times a frequency of said data signal;

bit storage means for storing an output of said product means as a bit train;

duty-factor check means for checking a duty-factor of said data signal of said arbitrary one period by checking said bit train stored in said bit storage means in compliance with a predetermined rule; and reference voltage variation means for varying said first reference voltage in accordance with an output of said duty-factor check means and for providing said first reference voltage to said comparison means.

2. A data slice circuit comprising:

reference voltage generating means for generating a reference voltage;

comparison means for comparing said reference voltage with a data signal having a first frequency;

sampling means for sampling an output of said comparison means at a second frequency, said second frequency being greater than "n" times said first frequency, "n" being greater than two;

sampling start means for starting said sampling means when said output of said comparison means changes;

memory means for storing a result of said sampling means as a series of binary data;

duty-factor check means for detecting a duty factor of said data signal on a basis of said series of binary data;

a counter for counting at said second frequency when said output of said comparison means changes, and for outputting an overflow signal when a count value of said counter becomes equal to "n", said overflow signal signalling said duty-factor check means to detect said duty factor;

sampling stop means for stopping said sampling means according to said overflow signal; and reference voltage variation means for increasing said reference voltage in a first case that said binary data corresponding to an amount that said data signal is higher than said reference voltage is more than a predetermined upper limit value, and for decreasing said reference voltage in a second case that said binary data corresponding to an amount that said data signal is lower than said reference voltage is less than a predetermined lower limit value in said series of binary data, according to said duty factor.

3. A data slice circuit comprising:

reference voltage generating means for generating a reference voltage;

comparison means for comparing said reference voltage and a data signal having a first frequency;

sampling means for sampling an output of said comparison means at a rate having a second frequency of "m", "m" being greater than four times said first frequency;

sampling start means for starting said sampling means when said output of said comparison means changes;

memory means for storing a result of said sampling means as a series of binary data;

a counter for counting an output of said sampling means when said output of said comparison means changes, and for outputting an overflow signal when a count value of said counter becomes equal to "m";

sampling stop means for stopping said sampling means according to said overflow signal; and reference voltage variation means for increasing said reference voltage in a first case that said binary data corresponding to an amount that said data signal is higher than said reference voltage is more than a predetermined upper limit value, and for decreasing said reference voltage in a second case that said binary data corresponding to an amount that said data signal is lower than said reference voltage is less than a predetermined lower limit value in said series of binary data, according to data extracted from a part of said stored binary data which is included in a substantially same time period before and after a center of one sampling period of said sampling means in said series of binary data stored in said memory means.

4. A data slice circuit in accordance with claim 2, characterized in that said reference voltage is not changed when all of said series of binary data are data representing that said data signal is lower than said reference voltage.

5. A data slice circuit in accordance with claim 3, characterized in that said reference voltage is not changed when all of said series of binary data are data representing that said data signal is lower than said reference voltage.

* * * * *